US008710700B2

(12) United States Patent  
Berggren et al.

(10) Patent No.: US 8,710,700 B2  
(45) Date of Patent: Apr. 29, 2014

(54) POWER OR VOLTAGE OSCILLATION DAMPING IN A POWER TRANSMISSION SYSTEM

(75) Inventors: Bertil Berggren, Vasteras (SE); Rajat Majumder, Raleigh, NC (US); Swakshar Ray, Vasteras (SE); Balarko Chaudhuri, London (GB); Nilanjan Ray Chaudhuri, London (GB)

(73) Assignee: ABB Research Ltd. (CH)

( * ) Notice: Subject to any disclaimer, the term of this patent is extended or adjusted under 35 U.S.C. 154(b) by 7 days.

(21) Appl. No.: 13/367,085

(22) Filed: Feb. 6, 2012

(65) Prior Publication Data

US 2012/0200166 A1    Aug. 9, 2012

Related U.S. Application Data

(63) Continuation of application No. PCT/EP2009/060245, filed on Aug. 6, 2009.

(51) Int. Cl.  
*H02J 3/24* (2006.01)

(52) U.S. Cl.  
USPC .......................................... 307/102; 307/105

(58) Field of Classification Search  
USPC ................................................ 307/102, 105  
See application file for complete search history.

(56) References Cited

U.S. PATENT DOCUMENTS

| 4,412,171 | A | * | 10/1983 | Kaufhold ........................ 322/20 |
| 5,642,007 | A | * | 6/1997 | Gyugyi et al. ................. 307/102 |
| 5,909,105 | A | * | 6/1999 | Noroozian ..................... 307/105 |
| 6,252,753 | B1 | | 6/2001 | Bhargava |
| 6,559,561 | B1 | | 5/2003 | Angquist |

FOREIGN PATENT DOCUMENTS

| CN | 1175324 A | 3/1998 |
| CN | 101202451 A | 6/2008 |
| EP | 1852952 A1 | 11/2007 |
| WO | 2008116929 A2 | 10/2008 |

OTHER PUBLICATIONS

Chaudhuri, et al.; "A Case Study on Challenges for Robust Wide-Area Phasor POD"; Jul. 26, 2009; pp. 1-6.  
Gama, et al.; "Commissioning and Operative Experience of TCSC for Damping Power Oscillation in the Brazilian North-South Interconnection"; 6 pages; 2000.  
Ängquist, et al.; "Damping Algorithm Based on Phasor Estimation"; Jan. 1, 2001; pp. 1160-1165.  
International Preliminary Report on Patentability; Application No. PCT/EP2009/060245; Issued: Sep. 21, 2011; 16 pages.  
International Search Report and Written Opinion of the International Searching Authority; Application No. PCT/EP2009/060245; Issued: Jun. 11, 2010; Mailing Date: Jun. 21, 2010; 13 pages.

* cited by examiner

*Primary Examiner* — Fritz M Fleming  
(74) *Attorney, Agent, or Firm* — St. Onge Steward Johnston & Reens LLC (57) ABSTRACT

A method, device and computer program product for providing improved control of power or voltage oscillation damping in a power transmission system. The device includes a magnitude obtaining element configured to obtain an instantaneous magnitude of a signal representing a deviating oscillation in at least one element of the power transmission system, a slope investigating element configured to determine the rate of change of the signal, and a first processing block including an integrating element configured to integrate the instantaneous magnitudes with an integrating factor that is based on the determined rate of change. The first processing block is further configured to form a phase compensation angle based on the integrated instantaneous magnitude for use in a damping control signal generating unit in order to provide power or voltage oscillation damping of the system.

23 Claims, 7 Drawing Sheets

POWER OR VOLTAGE OSCILLATION DAMPING IN A POWER TRANSMISSION SYSTEM

CROSS-REFERENCE TO RELATED APPLICATIONS

The present application is a continuation of pending International patent application PCT/EP2009/060245 filed on Aug. 6, 2009 which designates the United States and the content of which is incorporated herein by reference.

FIELD OF THE INVENTION

The invention relates to the field of power or voltage oscillation damping in electric power transmission systems. The invention more particularly concerns a method, device and computer program product for providing improved control of power or voltage oscillation damping in a power transmission system.

BACKGROUND OF THE INVENTION

Inter-area modes of oscillation are typically characterised by a group of machines in one geographical area of a power transmission system swinging against a group of machines in another geographical area of the system. Inter-area modes of oscillation is for instance described in CN 101202451, U.S. Pat. No. 6,252,753 and EP 1852952.

These oscillations are initiated by e.g. normal changes in the system load or switching events in the system possibly following faults. These oscillations may typically have a frequency of less than a few Hz, for instance in the range of 0.1-0.8 Hz, and are often considered acceptable as long as they decay fast enough. Insufficiently damped oscillations may occur when the operating point of the power system is changed, for example, due to a new distribution of power flows following a connection or disconnection of generators, loads and/or transmission lines. In these cases, an increase in the transmitted power of a few MW may make the difference between stable oscillations and unstable oscillations which have the potential to cause a system collapse or result in loss of synchronism, loss of interconnections and ultimately the inability to supply electric power to customers. Appropriate monitoring and control of the power transmission system can help a network operator to accurately assess power transmission system states and avoid a total blackout by taking appropriate actions such as the connection of specially designed oscillation damping equipment.

The conventional way to perform Power Oscillation Damping (POD) is by adding a modulation signal to the control signal of an actuator which counteracts the power oscillation. Typical actuators which could be controlled to perform such damping include synchronous generators, HVDC and FACTS installations.

There are different ways in which such oscillations can be dampened. One way is through using a POD device that employs lead-lag compensation.

Another way in which power oscillation damping can be performed is through the use of phasor based damping in a so-called phasor POD. A phasor POD is described in U.S. Pat. No. 6,559,561. In a phasor POD an auxiliary signal is provided to a power flow controller or voltage controller for actuators in the power transmission system in order to damp such oscillation. The phasor POD uses a scheme which expresses the active power, voltage or current oscillation in a rotating coordinate system and control action is synthesized in another phasor form to counteract the root oscillation. In this process, the knowledge of the system oscillation frequency, optimal phase difference of control signal with respect to measured signal and appropriate gain is needed a-priori. Thus with this technique an appropriate compensation angle needs to be known a-priori for each operating condition.

However there is a problem associated with using a fixed phase compensation angle in the above-described way. The configuration of a power transmission system may change, for instance because of a line outage following a severe fault. This means that different phase angles may be needed for different conditions. In order to provide efficient damping after a fault it may then be necessary to determine the operating condition after the fault. There is today no existing technique for determining such a post-disturbance operating condition.

There is therefore a need for improvement in this field of technology.

SUMMARY OF THE INVENTION

It is therefore an objective of the invention to enable phasor based power or voltage oscillation damping that can be applied without determining post-disturbance operating conditions. This objective is achieved by a method and a device for providing improved control of power or voltage oscillation damping in a power transmission system and a computer program product for providing improved control of power or voltage oscillation damping in a power transmission system. Further preferred embodiments are evident from the present teachings.

According to a first aspect of the invention, a method is provided for improved control of power or voltage oscillation damping in a power transmission system comprising the steps of: obtaining an instantaneous magnitude of a signal representing a deviating oscillation in at least one element of the power transmission system, determining the rate of change of the signal, integrating the instantaneous magnitude with an integrating factor that is based on the determined rate of change, and forming a phase compensation angle based on the integrated instantaneous magnitude for use in a damping control signal generating unit in order to provide power or voltage oscillation damping of the system.

According to a second aspect of the present invention a device for providing improved control of power or voltage oscillation damping in a power transmission system is provided. The power or voltage control device comprises a magnitude obtaining element configured to obtain an instantaneous magnitude of a signal representing a deviating oscillation in at least one element of the power transmission system, a slope investigating element configured to determine the rate of change of the signal, and a first processing block comprising an integrating element configured to integrate the instantaneous magnitudes with an integrating factor that is based on the determined rate of change, said first processing block being further configured to form a phase compensation angle based on the integrated instantaneous magnitude for use in a damping control signal generating unit in order to provide power or voltage oscillation damping of the system.

According to a third aspect of the present invention there is provided a computer program for providing improved control of power or voltage oscillation damping in a power transmission system. The computer program is loadable into an internal memory of a device for power or voltage oscillation damping and comprises computer program code means to make the device, when the program is loaded in the internal memory, obtain an instantaneous magnitude of a signal representing a deviating oscillation in at least one element of the power transmission system, determine the rate of change of the signal, integrate the instantaneous magnitude with an integrating factor that is based on the determined rate of change, and form a phase compensation angle based on the integrated instantaneous magnitude for use in a damping control signal generating unit in order to provide power or voltage oscillation damping of the system.

The invention according to these aspects enables canceling out of oscillations using an adaptively changed phase compensation angle. This can be implemented without prior knowledge of a post-fault operating condition. The invention is furthermore flexible in that any measurement signal that have high observability of the oscillation can be used without any significant modification. This also means that the invention can be used in relation to both local and wide area damping. This is made possible because the adaptive generation of phase angle compensation automatically considers different requirements arising from using different measurement signals. In this way duplicated phasor POD devices for local and wide area power or voltage oscillation damping can be avoided.

In one variation, integrating is performed on the instantaneous magnitude having a first polarity as well as on the instantaneous magnitude having an opposite polarity in parallel with the first polarity, the direction in rate of change of the signal is investigated and switching is made to forming phase compensation angles based on the integrated instantaneous magnitude of the opposite polarity in case the direction in rate of change has not been changed within a first time limit.

In another variation the instantaneous magnitude is multiplied with a proportional factor, and the forming of phase compensation angles is also based on the multiplied instantaneous magnitude.

The deviating oscillation will have a magnitude and it is possible to initially set the proportional factor according to this magnitude.

The rate of change of the signal can also be used for tuning of the proportional factor. The factor can for instance be reduced in case the direction in rate of change has not been changed within a second time limit. The rate of change of the signal can also be used for disabling the generation of a damping control signal in case it has not been changed within a third time limit.

The determining of a phase compensation angle according to the principles of the invention allows the provision of phasor based power or voltage oscillation damping on both locally measured and remotely measured signals.

According to another variation a system operation reflecting signal corresponding to a power property of the at least one system element is obtained and at least one signal representing a deviating oscillation is generated based on the system operation reflecting signal.

This system operation reflecting signal may be multimodal, in which case each mode component can then be extracted from this signal, a signal representing a deviating oscillation can be generated for each mode and phase compensation angles formed for each mode. Each such phase compensation angle may then be supplied to a corresponding damping control signal generating unit provided for the mode. For single actuating devices such as AVR, PSS or FACTS devices in the system, the final damping control signal is obtained by summing all the individual damping control signals from individual damping control units. For multiple actuating devices, if one actuating device is used for damping one particular mode, the corresponding damping control signal from the corresponding damping control signal generation unit is provided to the respective actuating device.

According to another variation the damping signal is formed with an amplitude corresponding to the signal magnitude and a phase corresponding to the phase adjustment angle.

BRIEF DESCRIPTION OF THE DRAWINGS

The subject matter of the invention will be explained in more detail in the following text with reference to preferred exemplary embodiments which are illustrated in the attached drawings, of which.

DETAILED DESCRIPTION OF THE INVENTION

Figure 1:
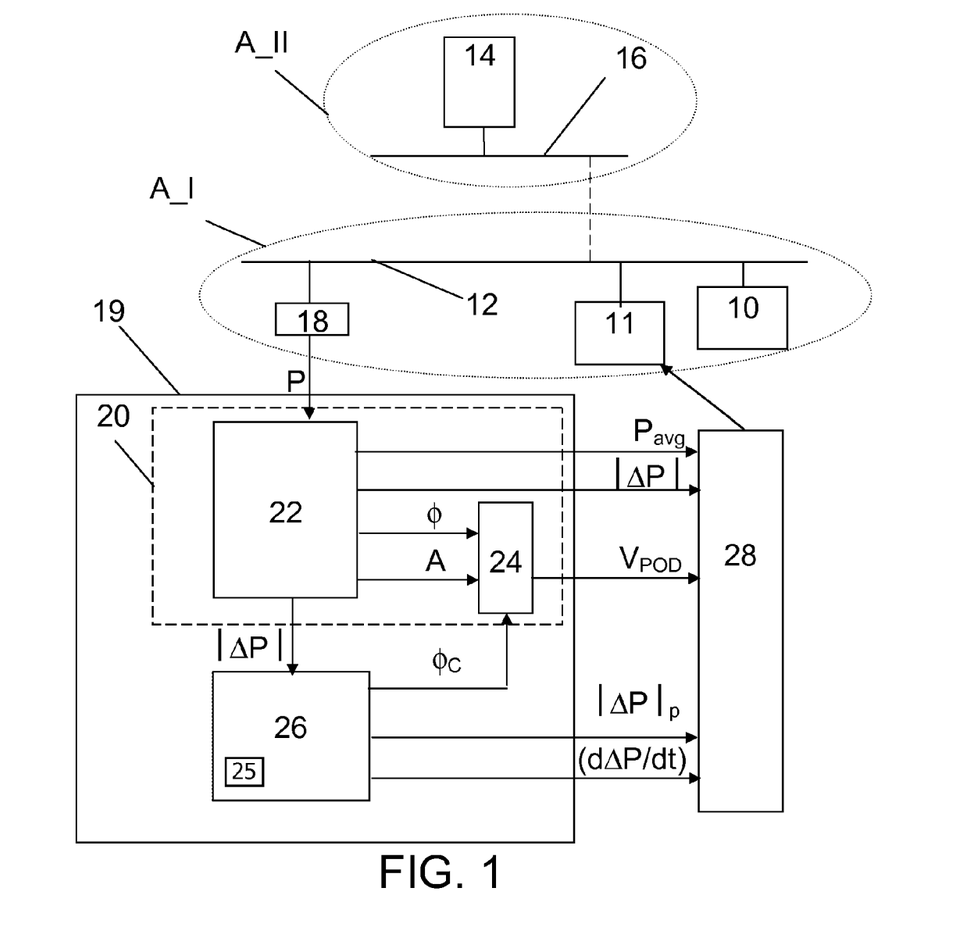
FIG. 1 schematically shows two geographical areas of a power transmissions system together with a phasor POD device and gain scheduling unit provided according to a first embodiment of the invention.

FIG. 1 schematically shows a simplified power transmissions system in which a device for providing improved control of power or voltage oscillation damping according to a first embodiment of the invention is provided. The power transmission system is preferably an AC power transmission system and then operating at a network frequency such as 50 or 60 Hz.

The power transmission system includes a number of geographical areas, which are here two areas A_I and A_II. These areas are indicated through dotted ellipses and are typically provided on great distances from each other, where one may as an example be provided in the south of Finland and another in the south of Norway. A geographical area is here a coherent area. A coherent area is an area where a group of electrical machines, such as synchronous generators, are moving coherently, i.e. they are oscillating together. Such an area may also be considered as an electrical area, because the machines are close to each other in an electrical sense. In these geographical areas there are high-voltage tie lines for connecting geographically separated regions, medium-voltage lines, substations for transforming voltages and switching connections between lines as well as various buses in the local areas. In order to simplify the description of the present invention the first geographical area A_I is here shown only including one first power line 12 or power transmission bus, one first electrical machine 10 and one actuating device 11 (FACTS, HVDC, PSS etc.) and the second geographical area A_II is only shown including one second power line 16 or power transmission bus and one second electrical machine 14. That these geographical areas are a part of the same system is indicated through a dashed line joining the two power lines 12 and 16 to each other.

This means that in this simplified example the first geographical area A_I only includes the first machine 10, while the second geographical area A_II only includes the second machine 14, which thus swing against each other. The actuating device 11 is in this example a device that can be influenced or controlled for removing such swings. In this first example the actuating device (FACTS, HVDC, PSS etc.) 11 is therefore an actuator, which is controlled through the use of the device for providing improved control of power or voltage oscillation damping of the present invention.

This first embodiment of the invention is directed towards a phasor based power oscillation damping device, a phasor POD device 19, which includes a phasor POD unit 20 and a compensation angle determining unit 26. The phasor POD unit 20 is here operating on local measurements, i.e. on measurements locally in the first geographical area and performing control also in this area. As will be apparent from other embodiments of the invention, the invention can also be applied on wide area power or voltage oscillation damping.

In order to provide local power or voltage oscillation damping there is here a first measurement unit 18 connected to the first power line. This measurement unit is in turn connected to an oscillation estimating unit 22, which oscillation estimating unit 22 is connected to a damping control signal generating unit 24. The oscillation estimating unit 22 together with the damping control signal generating unit 24 do in this first embodiment together make up the phasor POD unit 20 as described in U.S. Pat. No. 6,559,561, which document is herein incorporated by reference.

Both the oscillation estimating unit 22 and the damping control signal generating unit 24 are connected to the compensation angle determining unit 26 as well as to a gain scheduling unit 28. The compensation angle determining unit 26 is also connected to the gain scheduling unit 28, which gain scheduling unit is connected to and controls an actuator.

A device for providing improved control of power or voltage oscillation damping is according to the first embodiment of the invention solely made up of the compensation angle determining unit 26. However, it should be realized that a device for providing improved control of power or voltage oscillation damping may according to the principles of the invention be provided through any combination of this compensation angle determining unit 26 with the other units of the phasor POD device 19, i.e. the oscillation estimating unit 22 and damping control signal generating unit 24. It is furthermore possible to also include the gain scheduling unit 28 in any of these variations of a device for providing improved control of power or voltage oscillation damping according to the invention.

Figure 2:
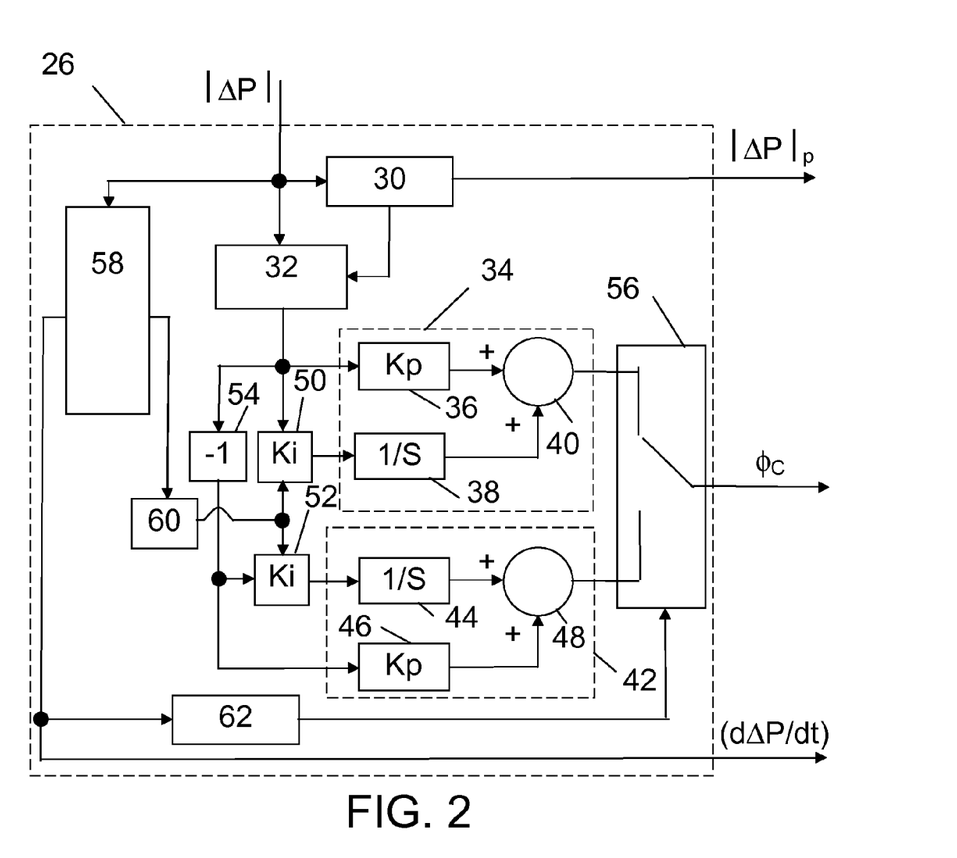
FIG. 2 shows a block schematic of a compensation angle determining unit according to the first embodiment of the invention used in the phasor POD device of FIG. 1.

FIG. 2 schematically shows a block schematic of the compensation angle determining unit 26. The compensation angle determining unit 26 includes a magnitude obtaining element in the form of a normalizing element 32, which receives a signal |ΔP|. There is also a peak detecting element 30 that also receives this signal |ΔP| and is connected to a tuning terminal of the normalizing element 32. The normalizing element 32 is in turn connected to a first processing block 34, to a first integration factor providing element 50, and to an inverter element 54. Also the first integration factor providing element 50 is connected to the first processing block. The inverter element 54 is in turn connected to a second integration factor providing element 52 and to a second processing block 42, where the second integration factor providing element 52 is connected to the second processing block 42. The processing blocks 34 and 42 here perform proportional and integrating processing activities and are therefore PI blocks in this first embodiment.

Each PI block 34 and 42 includes an integrator element 38 and 44 being connected between the corresponding integration factor providing element 50 and 52 and a summing element 40 and 48. Each PI block also includes a proportional amplifying element 36 and 46 with one end connected to the corresponding summing element 40 and 48. The proportional amplifying element 36 of the first PI block 34 is here at the other end connected to the normalizing element 32, while the proportional amplifying element 46 of the second PI block 42 is connected to the inverter element 54. The summing element 40 of the first PI block 34 is connected to a first input terminal of a switching element 56, while the summing element 48 of the second PI block 42 is connected to a second input terminal of the switching element 56, which switching element is provided with one output terminal providing a phase angle $\phi_C$. This output terminal is in this embodiment also a phase compensation angle output.

In the compensation angle determining unit 26 there is also a slope investigating element 58 that also receives the signal |ΔP|. The slope investigating element 58 is connected to an adjustment direction control element 62, which adjustment direction control element 62 is connected to a control terminal of the switching element 56 for controlling which input terminal is to be connected to the output terminal. The slope investigating element 58 is also connected to an integration factor tuning element 60.

Figure 3:
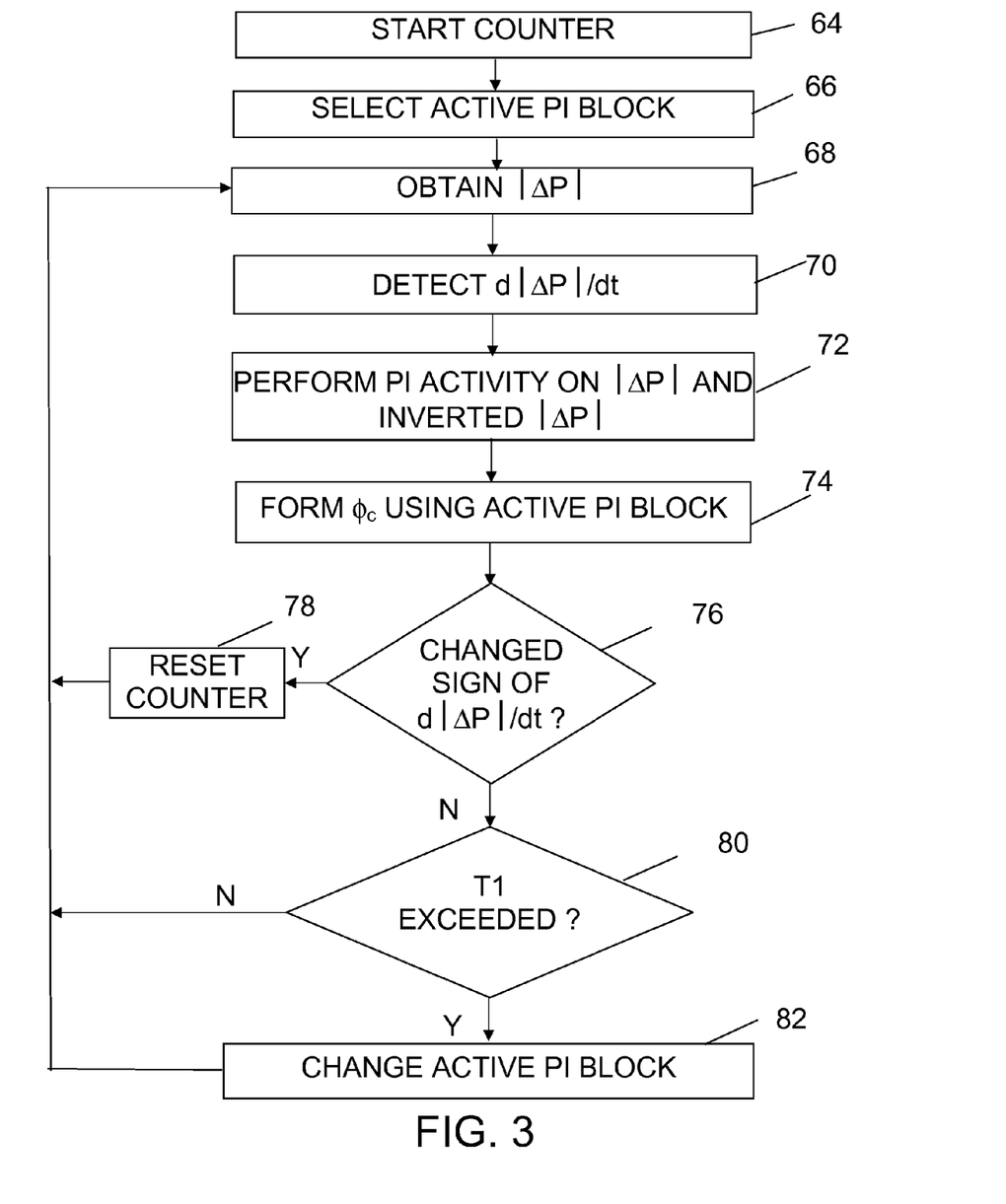
FIG. 3 schematically shows a flow chart outlining a number of method steps being performed in a method according to the first embodiment of the invention.

The first embodiment of the invention will now be described in more detail with reference being made to FIGS. 1 and 2 together with FIG. 3, which schematically shows a flow chart outlining a number of method steps being performed in a method according to the first embodiment of the invention.

As mentioned above, the machines 10 and 14 in the first and the second geographical areas A_I and A_II swing against each other, which typically takes place after a fault or a disturbance has occurred. This swing is normally a low frequency swing as compared to the operating frequency of the system.

In order to be able to counteract this swinging the measurement unit 18 provides measurements, typically voltage or current phasor measurements from a system element that is here the first power line 12 to the oscillation estimating unit 22 of the phasor POD unit 20. These measurements do in this first embodiment make up a system operation reflecting signal P. A system operation reflecting signal is here a signal that reflects a measured power property of at least one system element. It here reflects the power property both in respect of the operating frequency, but also in respect of an oscillator component, i.e. a signal component that causes the swinging. In this first embodiment this system operation reflecting signal is directly made up of measurements, such as voltage measurements made by the measurement unit 18. The oscillation estimating unit 22 then goes on and estimates the oscillatory component ΔP of the system operation reflecting signal, i.e. of these measurements. This oscillatory component ΔP is a deviating oscillation in the system element, i.e. an oscillation that deviates from the system steady state quantities. This component thus has a certain amplitude and frequency. The estimation may for instance be a recursive leastsquares estimation (RLS) according to the principles described in U.S. Pat. No. 6,559,561. An amplitude A and phase φ of this oscillatory component is then provided to the damping signal providing unit 24, which goes on and generates a damping control signal $V_{POD}$ that is provided to the gain scheduling unit 28. The phase and amplitude may here be pre-set to a default value, which can be any value or values set according to required gain and phase for operating conditions existing before the disturbance. The damping control signal may be generated based on the magnitude of the oscillatory component according to the principles described in U.S. Pat. No. 6,559,561. The oscillation estimating unit 22 furthermore provides a signal |ΔP| representing the oscillatory component in the form of the absolute value of this component together with a possible average level of this sensed signal to the gain scheduling unit 28. It also provides the absolute value of this component to the compensation angle determining unit 26.

The oscillatory component ΔP is typically the deviation of power flow or deviation of voltage or deviation of current in the system element from what is expected and typically includes single or multiple damped sinusoidal components. This signal normally appears because of a change of the operating condition of the system. This means that the signal |ΔP| varies between a maximum value and zero, which maximum value is thus detected. As the signal |ΔP| is first emitted from the oscillation estimating unit 22, a counter being handled by the adjustment direction control element 62 is started, step 64. The appearance of the signal |ΔP| furthermore causes a selection of an active PI block to be made in the compensation angle determining unit 26, for instance by the adjustment direction control element 62, step 66. This is a selection of which PI block that is to provide phase compensation angles. This selection may with advantage be a default selection and then a default selection of the first PI block 34. The selection ensures, through the element 62, that the switching element 56 connects the first PI block 34 with the adjustment angle output. Typically the compensation angle determining unit 26 will be activated for ordinary operation within one cycle of the oscillation. The peak detecting element 30 is provided in the compensation angle determining unit 26 in order to obtain the instantaneous magnitude $|ΔP|_p$ or peak of this signal |ΔP|. The first such peak detected is thus here the first peak after one cycle of oscillation. An instantaneous peak magnitude is thus obtained as a peak value of the absolute value of the deviation ΔP. The first detected instantaneous peak magnitude is furthermore provided to the normalization unit 32, which uses this instantaneous peak magnitude to set a range between one and zero to which the detected values are being normalized. The instantaneous peak magnitude $|ΔP|_p$ of the oscillatory component may be obtained through detecting the peak or RMS (root mean square) of the signal |ΔP| by the peak detecting element 30. Thereafter the signal |ΔP| is continued to be obtained or received, step 68, and provided to the normalizing element 32. The peak value is here thus used to normalize the signal |ΔP| by the normalizing element 32, which normalized signal |ΔP| is then provided to the first integration factor providing element 50, the first proportional amplifying element 36 and the inverter element 54. The inverter element 54 inverts the normalized signal |ΔP| and provides this normalized inverted signal −|ΔP| to the second integration factor providing element 52 and the second proportional amplifying element 46 of the second PI block 42. As this is done the rate of change d|ΔP|/dt of the signal |ΔP| is detected by the slope investigating element 58, step 70, This element also forms an absolute value |d|ΔP|/dt| of the rate of change or slope. Both these values d|ΔP|/dt and |d|ΔP|/dt | are provided to the integration factor tuning element 60, which in turn uses them for influencing the setting of an integrating factor Ki in the two integration factor providing elements 50 and 52. The integration factor providing elements 50 and 52 in turn applies this factor Ki in the integrating elements 38 and 44. The integrating elements thus perform integration using the integrating factor Ki. The two versions of the signal |ΔP|, which are a normalized positive instantaneous magnitude and a negative instantaneous magnitude, are thus supplied to the two PI blocks in parallel, which perform a PI activity on the absolute (positive) instantaneous magnitude of the signal |ΔP| and inverted absolute (negative) instantaneous magnitude of the signal |ΔP|, step 72.

In the first embodiment this means that the instantaneous magnitude and inverted instantaneous magnitude is multiplied with a proportional factor Kp in elements 36 and 46 and integrated with the integrating factor Ki in the integrating elements 38 and 44. In this first embodiment the proportional factor Kp is stationary or fixed, while the integrating factor is variable, i.e. it is varied based on the rate of change d|ΔP|/dt or slope of the signal. Typically a high value, i.e. a steep slope leads to a high factor being used while a low value or a small slope leads to a low factor being used. This means that the instantaneous magnitude is integrated with an integrating factor Ki that is based on the determined rate of change. The proportionally controlled and integrated instantaneous magnitude and inverted instantaneous magnitude are then in each PI block combined in a corresponding summing element 40 and 48 for forming two candidate compensation angles, where the result of the combination made based on the positive instantaneous magnitude is originally provided as a phase compensation angle $φ_C$ via the switching element 56 output and the combination based on the negative instantaneous magnitude for is initially not used. Thus a compensation angle $φ_C$ is formed based on the instantaneous magnitude of the signal |ΔP| using the active PI block, which is here the first PI block, step 74.

The compensation angle $φ_C$ is then provided to the damping control signal generating unit 24 of the phasor POD unit 20, which goes on and uses this phase compensation angle $φ_C$ in the forming of the damping control signal $V_{POD}$. This damping control signal $V_{POD}$ is then supplied to the scheduling unit 28 as is the average value $P_{avg}$, and the absolute value of the deviating oscillation |ΔP|. The compensation angle determining unit 26 here also supplies the peak value $|ΔP|_p$ of the oscillation and the slope values d|ΔP|/dt to this scheduling unit 28. This data is then used together with knowledge of the structure of the actuator used for generating a specific actuator control signal used to control the actuator 10. The damping control signal $V_{POD}$ is then with advantage a modulation signal, which can be added to a control signal generated by gain scheduling unit 28 for controlling the actuator 11. Phase adjustment angles are thereafter continued to be determined in the same way for later detected values of the signal |ΔP|.

In this way the oscillation is canceled out with the help of an adaptively changed phase compensation angle. Through the use of a phase compensation angle generated in this way the magnitude of the absolute oscillation will then be reduced to zero. This means that as the absolute oscillation magnitude starts to decrease, the output of the first PI block slowly saturates to a phase compensation angle value that provides appropriate damping to the system oscillation after the change of the operating condition. This is furthermore done without any prior knowledge of the post-fault operating condition.

In this way the oscillation is dampened out adaptively. There is no need to know any pre-conditions regarding the system after a fault in the system. It is furthermore flexible in that it can adapt to any situation. The invention does not need any linear model of the system for obtaining the phase compensation angle. This means that any measurement signal that has high observability of the mode of oscillation can be used without any significant modification. This also means that the phasor POD device can be used for both local and wide area damping. This is made possible because the adaptive generation of phase angle compensation automatically considers different requirements arising from using different measurement signals. In this way duplicated phasor POD devices for local and wide area power or voltage oscillation damping can therefore be avoided.

Figure 4:
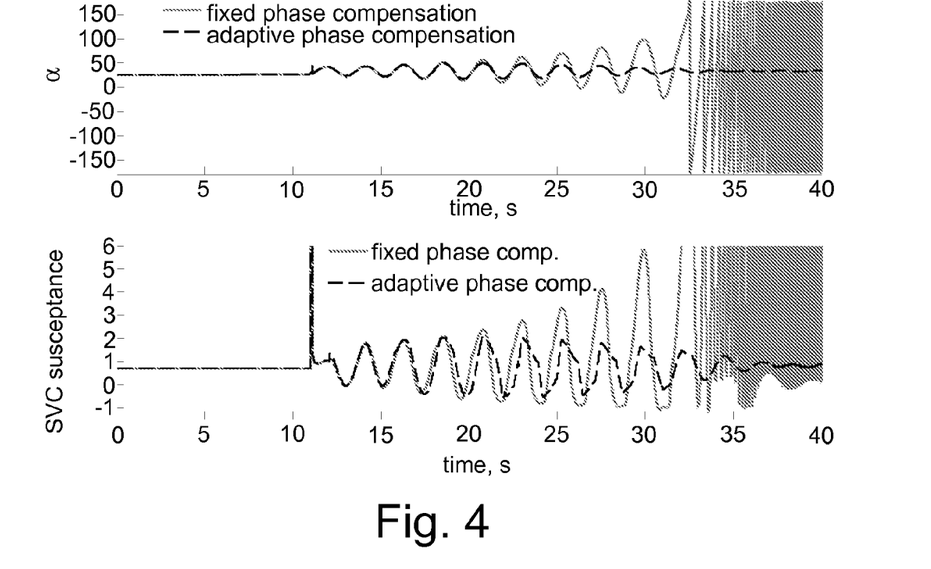
FIG. 4 shows two diagrams where adaptive power oscillation damping is compared with power oscillation damping with a fixed phase angle after the occurrence of a three-phase fault.

FIG. 4 shows two diagrams where adaptive power oscillation damping is compared with power oscillation damping with a fixed phase angle of 25 degrees after the occurrence of a system fault. Here the upper diagram shows an angle difference α over time. This angle difference α is here the phase difference between the two power transmission buses from FIG. 1 over time, where the difference angle for power oscillation damping using the adaptive scheme of the invention is shown with a dark dashed curve, while the difference angle for power oscillation damping with a fixed phase angle is shown with a lighter solid curve. The lower diagram in FIG. 4 shows the normalized susceptance of an actuating device, which actuating device in this example is in the form of a Static Var Compensator. As in the upper diagram control using a fixed phase angle is represented by a solid light curve and control using the adaptive scheme of the invention is represented by a dashed darker curve. As can be seen in the diagrams the power oscillations damping with an adaptively determined compensation angle provides wide-area control that stabilizes a power system following a fault, while the control using a fixed compensation angle leads to an unstable system.

The phase compensation is here angularly performed with a positive phase compensation angle, i.e. for instantaneous magnitudes having a first polarity, a positive polarity. However, it is possible that the phase compensation angle should have an opposite sign, i.e. be a negative phase compensation angle based on instantaneous magnitudes having the opposite polarity.

In order to handle this situation, the slope investigating element 58 continuously provides slope detection values to the adjustment direction control element 62. These values can be positive, negative or zero. Originally the signal |ΔP| will have a slope that is positive. If phase adjustment is made in the correct angular direction, this slope will then decrease, become zero and eventually turn negative in a given time period. However if it does not do this within the given time period, the angular direction in which adjustment was made was wrong and the opposite direction should have been used. The first embodiment of the present invention addresses this situation through the adjustment direction control element 62 receiving the rate of change measurements d|ΔP|/dt from the slope investigating element 60 and investigating the sign of these rates of change or slope. If the sign changes, step 76, the adjustment direction control element 62 resets the counter, step 78, and then continues and obtains magnitude values, step 68. However, if the sign is not changed, step 76, the adjustment direction control unit 60 continues and compares the time of the counter with a first time threshold T1, step 80. If this threshold T1 is not exceeded, generation of the phase compensation angle continues as before, step 68, while if it is exceeded, step 80, the adjustment direction control element 60 actuates the switching element 56 so that now the phase compensation angle $\phi_C$ is provided by the second PI block 42.

In this way the adjustment direction control element 60 changes the active PI block, step 82, and ensures that the compensation angle $\phi_C$ is formed based on the inverted instantaneous magnitude instead. Thereafter the forming of phase compensation angles is continued based on the inverted instantaneous magnitude.

In this way it is ensured that the oscillation is cancelled out quickly even though the wrong direction is initially selected.

Figure 5:
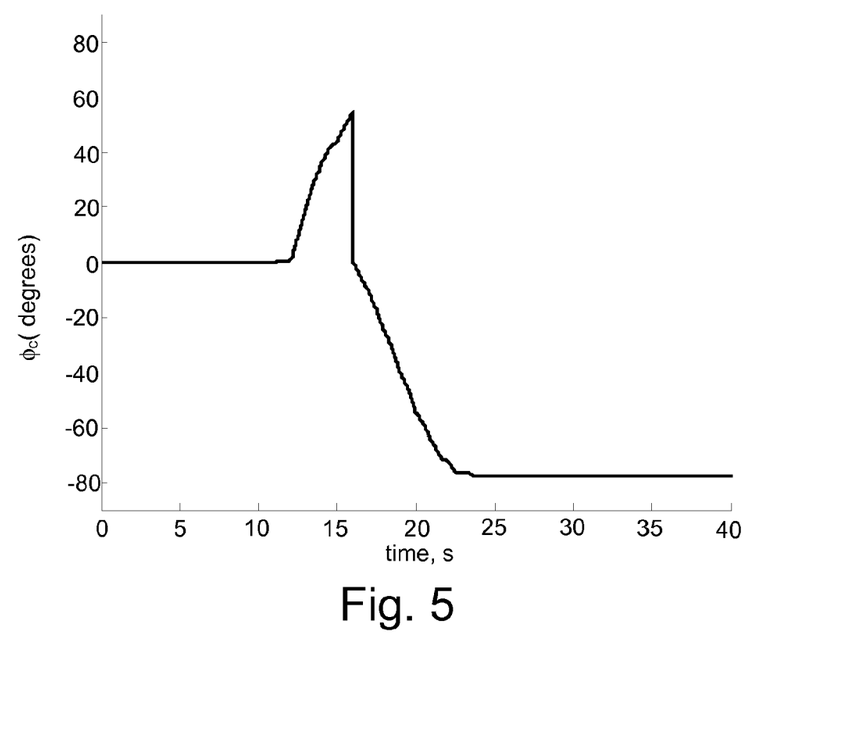
FIG. 5 shows a diagram of the phase compensation angle determined according to the principles of the first embodiment of the invention.

The adaptively changed compensation angle $\phi_C$ after the occurrence of a fault being provided according to the first embodiment of the invention is schematically shown in FIG. 5. From this figure it can be seen that the phase compensation is initially performed in a positive direction, which is found to be wrong after about 5 seconds after the fault, which time is thus an exemplifying first threshold. Therefore the phase compensation is thereafter performed in the negative direction. From the curve it can be seen that a stable phase compensation angle of about −77 degrees is obtained after about 12 seconds.

It should here be mentioned that there are a number of variations that can be made in relation to this first embodiment of the invention. It is possible that the second PI block is used first and the first PI block is used if the second PI block provided a phase compensation angle in the wrong direction. It is furthermore possible that only one direction is investigated, i.e. that one PI block is removed. In this case there is also no need for the adjustment direction control element and switching element. It is also possible to omit the proportional leg of the PI blocks, i.e. to only use integrating activity. Also normalization may be omitted. It is possible to provide a low pass filter before the slope investigating element 58 in order to filter out high frequency elements before slope detection is performed.

The negative direction may thus not be investigated. It is here possible that instead of this or in addition, that if the magnitude grows then the proportional factor is influenced such that it is decreased. For this reason the compensation angle determining unit may also include a proportional factor tuning element that changes the proportional factor. This change may be performed based on the rate of change or slope of the absolute oscillation magnitude, i.e. the rate of change of the signal. It is also possible to completely disable the damping control signal. Thus the timing of the counter may be compared with a second threshold and if this is exceeded the proportional factor is decreased. The timing of the counter may also be compared with a third threshold and if this is exceeded, the damping operation is disabled. In this latter case the compensation angle determining unit may include an operation aborting element 25 that would send a disable signal to the damping signal generating unit 24 of the phasor POD unit 20, which as a response would no longer generate the damping signal V.sub.POD. This third threshold may with advantage be the same as the first threshold. It is furthermore possible that the compensation angle determining unit receives the magnitude of the signal .DELTA.P. In this case it is possible that proportional factor is initially set according to this magnitude. Finally it should be mentioned that the start of operation of the compensation angle determining unit is not limited to the first peak after one cycle of oscillation.

The phasor POD device shown in the first embodiment is a phasor POD device operating locally, i.e. operating on locally measured values. However, it is possible also to use the phasor POD device as a wide area phasor POD device, i.e., for remotely measured values. The phasor POD device may thus be used in other situations than for local damping. It may be used for wide area damping. This means that it may receive measurements from other geographical areas than a local area. It is then possible to use the POD assisting unit described in the first embodiment of the invention. However, it is also possible to use a compensation angle determining unit according to a second embodiment of the invention, which furthermore considers also the time delay of such measurements. A phasor POD device according to the second embodiment of the invention will now be described with reference being made to FIGS. 6 and 7, where FIG. 6 shows four geographical areas of a power transmissions system together with a phasor POD device and gain scheduling unit and FIG. 7 shows a block schematic of a compensation angle determining unit according to the second embodiment.

Figure 6:
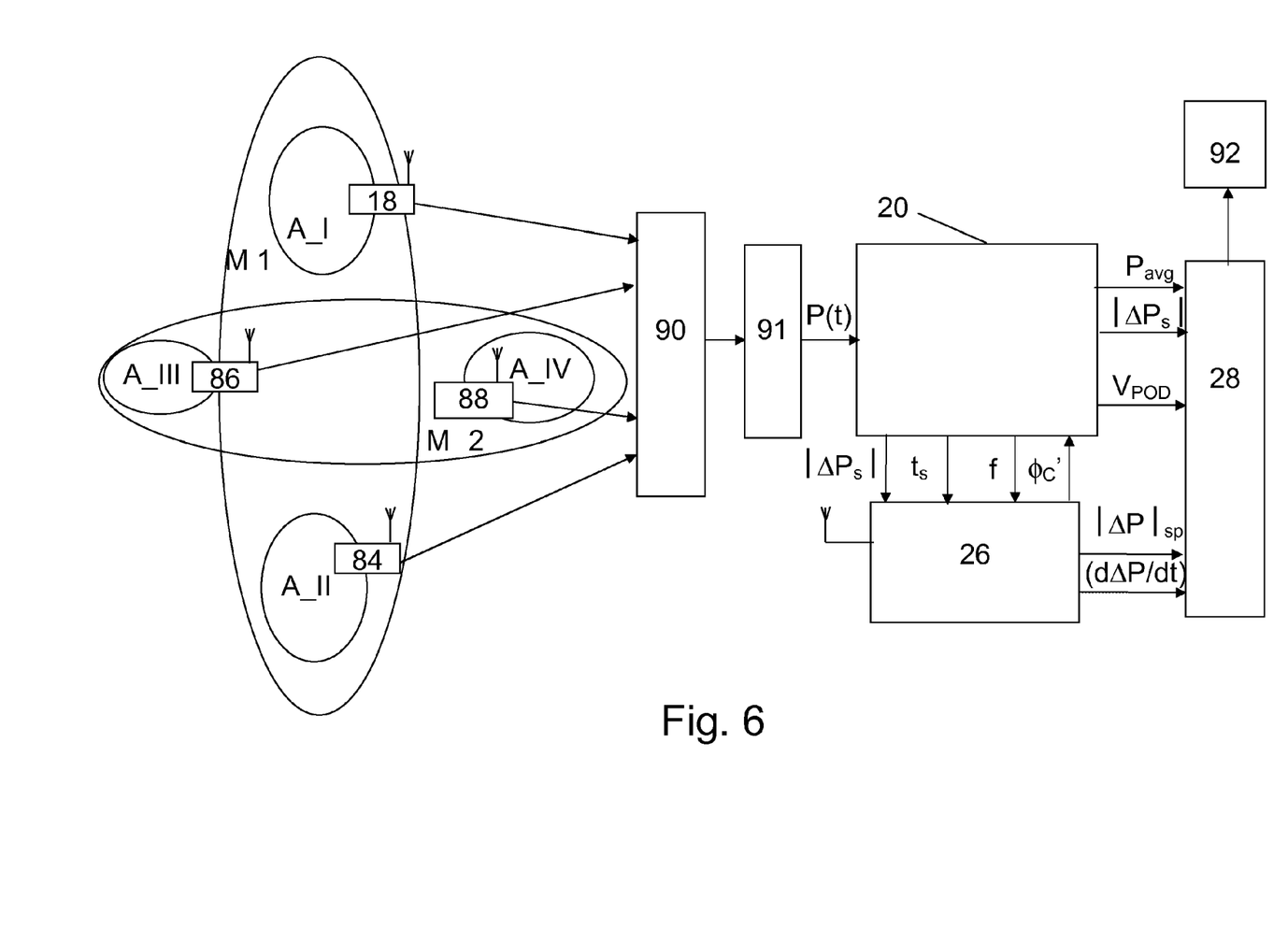
FIG. 6 schematically shows four geographical areas of a power transmissions system together with a phasor POD device and gain scheduling unit provided according to a second embodiment of the invention.
Figure 7:
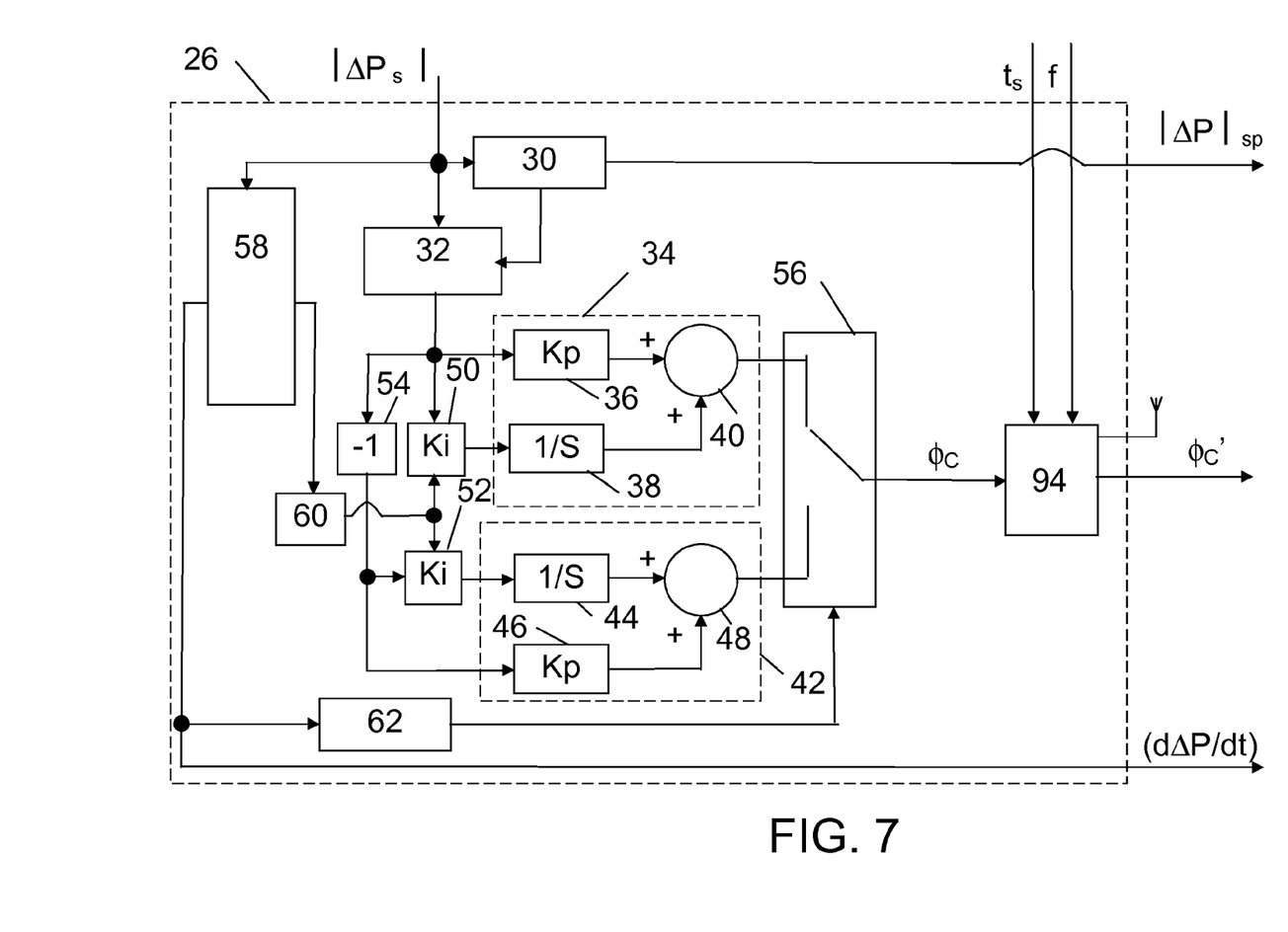
FIG. 7 shows a block schematic of a compensation angle determining unit according to the second embodiment of the invention used in the phasor POD device of FIG. 5.

In the system in FIG. 6 there are four geographical areas A_I, A_II, A_II and A_IV, that may each swing against one of the other geographical areas. Each area is provided with a measurement unit 18, 84, 86 and 88. It should here be realized that there may be more measurement units in each geographical area. Measurement units are furthermore normally connected to power lines and buses. A measurement unit may here be a Phasor Measurement Unit (PMU). A PMU provides time-stamped local information about the system, in particular currents and voltage phasors. A plurality of phasor measurements collected throughout the network by PMUs and processed centrally can therefore provide a snapshot of the overall electrical state of the power transmission system. Such PMUs are normally also equipped with GPS synchronized clocks and will send phasors, such as positive sequence phasors, at equidistant points in time, e.g. every 20 ms. These phasors are thus time stamped with high accuracy, and the time stamp may represent the point in time when the phasor was measured in the system. The phasors could be time stamped, i.e. receive time indicators, using Assisted GPS (A-GPS). In order to perform such time stamping each measurement unit 18, 84, 86 and 88 is therefore provided with an antenna for communicating with a GPS satellite.

The phasors are thus obtained at distant geographical locations and time stamped by the measurement units, normally using a GPS clock and sent via communication channels, which are potentially several thousand kilometers in length, to a phasor aligning unit 90.

The measurement units 18, 84, 86 and 88 are thus all connected to a phasor aligning unit 90, which may be a Phasor Data Concentrator (PDC). This phasor aligning unit 90 thus receives the above-described phasors and synchronizes them, i.e. packages the phasors with the same time stamp.

The phasor aligning unit 90 listens to measurement units that are sending time stamped phasors on a regular basis (e.g. every 20 ms). The phasor aligning unit 90 aligns the phasors according to the time stamp, expecting one phasor from each measurement unit per time slot, and forwards all phasors when these corresponding to a given time slot are available.

The phasor aligning unit 90 is furthermore connected to a combining unit 91, which combines phasors from at least two areas in order to provide a system operations reflecting signal P(t). In this embodiment the system operation reflecting signal is thus a combined signal reflecting a measured power property, like voltage, of more than one system element, here two. It here reflects the power property both in respect of the operating frequency and the oscillatory component This combing unit 91 is then connected to a phasor POD unit, which phasor POD unit 20 is connected to a compensation angle determining unit 26 and a gain scheduling unit 28 in the same way as in FIG. 1. The gain scheduling unit 28 is furthermore connected to an actuator 92 for performing damping in the system. This could be a local actuator, in the same geographical area where the phasor POD is located or in another geographical area. Also the compensation angle determining unit 26 is connected to the gain scheduling unit 28 in the same way as in FIG. 1. There is one difference with the compensation angle determining unit 26 though and that is that it is provided with an antenna. The device for providing improved control of power or voltage oscillation damping of the present invention may here include any combination of the compensation angle determining unit with oscillation estimating unit, damping control signal generating unit, gain scheduling unit, combining unit and phasor aligning unit.

As can be seen in FIG. 7, the compensation angle determining unit 26 according to the second embodiment is in most parts the same as in the first embodiment. However it is provided with a latency compensating element 94 connected to the output of the switching element 56. This latency compensating element 94 is provided with said antenna for communicating with a GPS satellite, for instance using A-GPS, in order to obtain an accurate time. It also receives the time stamps associated with samples of the deviating oscillation or rather the time stamps associated with the measurement values on which these samples are based.

The phasor POD unit 20 does in this embodiment determine a signal representing the deviating oscillation in the form of the absolute value of this oscillation based on phasors from two areas that swing against each other from measurement units having the same time stamps, which is done based on the combined signal P(t). The combined signal may here be a difference signal based on the difference between phasors from two areas having the same time stamp. A signal $|\Delta P_s|$ may then be generated by the phasor POD unit 20 based on such a combined signal. The signal $|\Delta P_s|$, the frequency f of the swing and the value $t_s$ of the time stamps of the corresponding samples are provided to the compensation angle determining unit 26, where the latency compensating unit 94 receives such time stamp values $t_s$ and the swing frequency f. The latency determining unit 94 thus receives the time stamp or time value associated with the deviating oscillation at system elements for a specific instantaneous magnitude of the signal $|\Delta P_s|$, i.e. for the instantaneous magnitude that is determined based on the measurements having these time stamps or time values. The compensation angle determining unit 26 according to this second embodiment determines a phase adjustment angle $\phi_c$ in the same way as in the first embodiment, which angle is provided at the output of the switching element 56. However this angle is further adjusted in order to obtain a correct phase adjustment value that also considers the latency of the measurements. More particularly the latency compensating unit 94 based on this received time value $t_s$ and an own current time $t_c$ determines a time delay $T_d$ according to:

$$T_d = t_c - t_s.$$

This time delay is then used for determining a time delay compensation factor $\phi_d$ according to:

$$\phi_d = 2 * \pi * f * T_d$$

This leads to the obtaining of an adjusted phase compensation angle $$\phi_a' = \phi_c + \phi_d$$

As can be seen the latency determining unit 94 thus determines a time delay compensation factor $\phi_d$ based on the time value $t_s$, the current time $t_c$ and the frequency f of the oscillation and adjusts the phase compensation angle with this time delay compensation factor. In this way it is also possible to take account of the time delay of the measurement signals, which is of importance when these are taken far from the phasor POD device. This speeds up the damping process in wide area power or voltage oscillation damping situations.

According to a variation of the second embodiment it is also possible that the system operation reflecting signal is a signal reflecting a property in only one element, a remote element far from the phasor POD device.

As can be seen in FIG. 7, it is possible that several areas may swing against each other. This swinging can also take place simultaneously. It is therefore possible that a combining unit 91 provides one system operation reflecting signal that is made up of several such swings. A deviating oscillation may thus be multimodal. The system operation reflecting signal is thus a combined signal reflecting a measured power property, like voltage, of more than one system element, here two. It here reflects the power property both in respect of the operating frequency and more than one oscillatory component. Such a combined signal may here be provided through generating a number of difference phasors each being provided as the difference between the phasors of two geographical areas and then summing these difference phasors for obtaining a combined signal. As an alternative it is possible that this system operating reflecting signal is made up of measurements from only one system element, which system element thus experiences swinging between several geographical areas.

Figure 8:
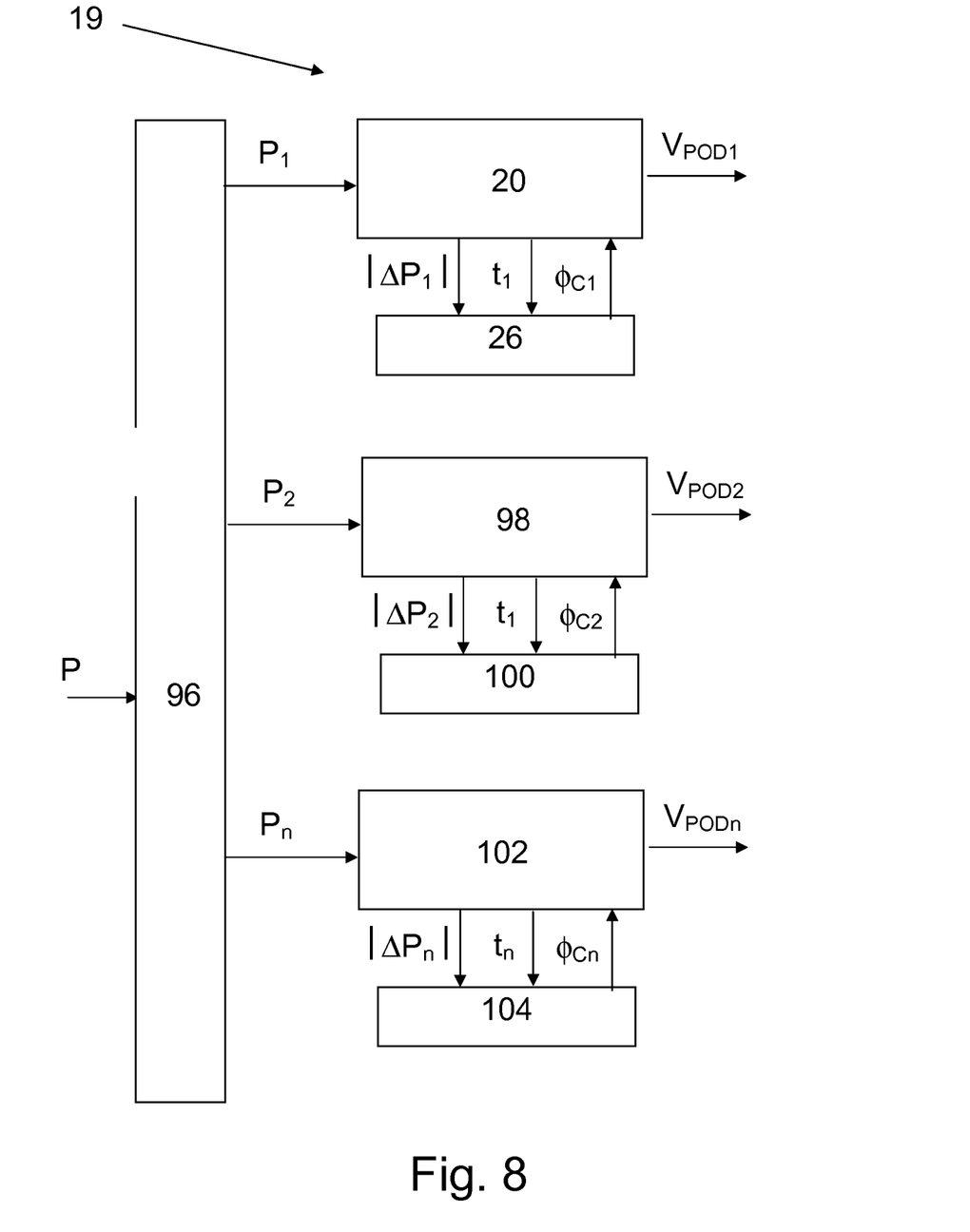
FIG. 8 schematically shows a phasor POD device according a third embodiment of the invention.

In order to handle such a combined or multimodal signal P there may be provided a phasor POD device 19 as outlined in FIG. 8. Here there is a signal extracting unit 96, which splits the combined signal according to the estimated frequencies, i.e. it extracts each mode component from the combined signal P. In this example it does this through splitting the combined signal P into a first, second, . . . and n-th signal $P_1$, $P_2$ and $P_n$, where each such signal is provided to a corresponding phasor POD unit 20, 98 and 102. To each of these phasor PODs units there is connected a corresponding compensation angle determining unit 26, 100 and 104 providing a phase adjustment angle $\phi_{c1}$, $\phi_{c2}$ and $\phi_{cn}$ to the corresponding phasor POD unit 20, 98 and 102. The phasor POD units then each provide a corresponding damping control signal $V_{POD1}$, $V_{POD2}$ and $V_{POD3}$. It is here possible that these damping control signals are combined and provided to a common gain scheduling unit connected to one actuator. It is also possible that each such damping control signal is provided to a corresponding gain scheduling unit, which controls an actuator. The gain scheduling unit selected is generally dependent on which areas that swing against each other. An actuator in an area involved in several such swings can therefore be controlled by a damping control signal cancelling these swings. For multiple actuating devices, if one actuator is devoted for damping one particular mode then corresponding $V_{POD}$ signal can be directly fed from individual phasor PODs to the corresponding actuating devices.

It should here be realized that time delay compensation may be applied also in this variation of the invention.

There are a number of further variations that are possible to make of the present invention. The oscillations estimating unit and damping signal generating units need not be provided together in the same entity, but they may be separated. The system elements from which measurements are being made are with advantage power lines. However, it should be realized that also other types of system elements can be envisaged, such as converters and transformers.

The device according to the invention, i.e. the compensation angle determining unit either alone or in any of the previously described combinations, may with advantage be provided in the form of a controller having processor together with an internal memory including computer program code, which when being operated on by the processor performs the above mentioned functionality of the units included in the device. The program code can also be provided on a data carrier, which performs this functionality when being loaded into such a memory. It will therefore be apparent to the skilled man that the device for providing improved control of power or voltage oscillation damping of the present invention may be hardwired or implemented as a computer program.

The device for providing improved control of power or voltage oscillation damping may be provided via a wide-area monitoring and control platform.

In a further embodiment, the device for providing improved control of power or voltage oscillation damping of the present invention may be run on a FACTS device, specifically the low level power electronics control platform for the FACTS device, or alternatively on a fast acting device such as an AVR or a direct load modulator.

The present invention is therefore only to be limited by the following claims.

What is claimed is:

1. A method for providing improved control of power or voltage oscillation damping in a power transmission system comprising the steps of:

obtaining an instantaneous magnitude of a signal ($|\Delta P|$) representing an oscillation deviating from steady state quantities in at least one element of the power transmission system, $\Delta P$ being an oscillatory component of a system operation reflecting signal (P), which P reflects a measured power property of the at least one system element, determining the rate of change of the signal, integrating the instantaneous magnitude with an integrating factor that is based on the determined rate of change, and forming a phase compensation angle based on the integrated instantaneous magnitude in a damping control signal generating unit in order to provide power or voltage oscillation damping of the system.

2. The method according to claim 1, wherein the integrating is performed on the instantaneous magnitude of a signal having a first polarity and the method further comprises the steps of integrating the instantaneous magnitude of a signal having an opposite polarity in parallel with the integrating of the instantaneous magnitude of a signal having a first polarity, investigating the direction in rate of change of the signal, and switching to forming phase compensation angles based on the integrated instantaneous magnitude of a signal of the opposite polarity in case the direction in rate of change has not been changed within a first time limit.

3. The method according to claim 1 further comprising a step of multiplying the instantaneous magnitude with a proportional factor, where the step of forming a phase compensation angle comprises forming a phase compensation angle also based on the multiplied instantaneous magnitude.

4. The method according to claim 3, where the deviating oscillation has a magnitude and the proportional factor is initially set according to this magnitude of the signal.

5. The method according to claim 3, further comprising the step of tuning the proportional factor based on the rate of change of the signal.

6. The method according to claim 5, further comprising the step of reducing the proportional factor in case the direction in rate of change has not been changed within a second time limit.

7. The method according to claim 1, further comprising the step of disabling the generation of a damping control signal in case the direction in rate of change has not been changed within a third time limit.

8. The method according to claim 1, further comprising steps of obtaining a time value associated with the deviating oscillation at said at least one system element for a specific instantaneous magnitude of said signal being processed, determining a time delay compensation factor based on this time value, a current time and the frequency of the oscillation and adjusting the phase compensation angle with this time delay compensation factor.

9. The method according to claim 1, wherein the method can be used on both locally measured and remotely measured signals.

10. The method according to claim 1, wherein the system operation reflecting signal (P) is multimodal, the step of obtaining an instantaneous magnitude of a signal ($|\Delta P|$) representing a deviating oscillation comprises obtaining one such ($|\Delta P|$) for each mode and further comprising steps of extracting each mode component from said operation reflecting signal, forming a phase compensation angle for each mode and supplying each phase compensation angle to a corresponding damping control signal generating unit provided for the modes.

11. The method according to claim 1, further comprising a step of forming a damping signal with an amplitude corresponding to said instantaneous magnitude and a phase corresponding to said phase compensation angle, by means of the damping control signal generating unit.

12. A device for providing improved control of power or voltage oscillation damping in a power transmission system, comprising:
 a magnitude obtaining element configured to obtain an instantaneous magnitude of a signal ($|\Delta P|$) representing an oscillation deviating from steady state quantities in at least one element of the power transmission system, $\Delta P$ being an oscillatory component of a system operation reflecting signal (P), which P reflects a measured power property of the at least one system element,
 a slope investigating element configured to determine the rate of change of the signal and,
 a first processing block comprising an integrating element configured to integrate the instantaneous magnitude with an integrating factor that is based on the determined rate of change, said first processing block being further configured to form a phase compensation angle based on the integrated instantaneous magnitude in a damping control signal generating unit in order to provide power or voltage oscillation damping of the system.

13. The device according to claim 12, wherein the first processing block is configured to operate on instantaneous magnitudes of a signal having a first polarity and further comprises, a second processing block having an integrating element configured to integrate the instantaneous magnitude of a signal having an opposite polarity in parallel with the integrating of the instantaneous magnitude of a signal having a first polarity in the first processing block and an adjustment direction control element configured to investigate the direction in rate of change of the signal and to switch in the second processing block for forming phase compensation angles based on the integrated instantaneous magnitude of the opposite polarity in case the direction in rate of change has not been changed within a first time limit.

14. The device according to claim 12, wherein each processing block further comprises a proportional multiplying element configured to multiply the instantaneous magnitude with a proportional factor and a combining element configured to form phase compensation angles based on the multiplied and integrated instantaneous magnitudes.

15. The device according to claim 14, further comprising at least one proportional factor tuning element configured to adjust the proportional factor.

16. The device according to claim 15, where the deviating oscillation has a magnitude and the proportional factor tuning element is configured to initially set the proportional factor of each proportional multiplying element according to this magnitude.

17. The device according to claim 15, wherein the proportional factor tuning element is configured to tune the proportional factor based on the rate of change of the signal.

18. The device according to claim 17, wherein the proportional factor tuning element is configured to reduce the proportional factor of each proportional multiplying element in case the direction in rate of change has not been changed within a second time limit.

19. The device according to claim 12, further comprising an operation aborting element configured to disable the generation of a damping control signal in case the direction in rate of change has not been changed within a third time limit.

20. The device according to claim 12, further comprising a latency compensating element configured to obtain a time value associated with the deviating oscillation at said system element for a specific instantaneous magnitude of said signal being processed, determine a time delay compensation factor based on this time value, a current time and the frequency of the oscillation and adjust the phase compensation angle with this time delay compensation factor.

21. The device according to claim 12, wherein the system operation reflecting signal is multimodal, there is one oscillation estimating unit for each mode and further comprising a signal extracting unit configured to extract each mode component from said operation reflecting signal, a set of compensation angle determining units each comprising a magnitude obtaining element, a slope investigating element and a first processing block for forming a corresponding phase compensation angle for one mode of said modes, and supply this phase compensation angle to a corresponding damping control signal generating unit provided for the mode.

22. The device according to claim 12, further comprising the damping control signal generating unit configured to form a damping signal with an amplitude corresponding to said instantaneous magnitude and a phase corresponding to said phase compensation angle.

23. A computer program for providing improved control of power or voltage oscillation damping in a power transmission system, the computer program loaded into an internal memory of a device for power or voltage oscillation damping and comprising computer program code means to make the device,
 obtain an instantaneous magnitude of a signal ($|\Delta P|$) representing an oscillation deviating from steady state quantities in at least one element of the power transmission system, $\Delta P$ being an oscillatory component of a system operation reflecting signal (P), which P reflects a measured power property of the at least one system element,
 determine the rate of change of the signal,
 integrate the instantaneous magnitude with an integrating factor that is based on the determined rate of change, and
 form a phase compensation angle based on the integrated instantaneous magnitude in a damping control signal generating unit in order to provide power or voltage oscillation damping of the system.

* * * * *